United States Patent
Pflug et al.

(10) Patent No.: US 9,262,828 B2
(45) Date of Patent: Feb. 16, 2016

(54) METHOD AND DEVICE FOR ONLINE CALIBRATION OF VEHICLE CAMERAS

(71) Applicant: ESG ELEKTRONIKSYSTEM—UND LOGISTIK-GMBH, Furstenfeldbruck (DE)

(72) Inventors: Christopher Pflug, Hebertshausen-Unterweilbach (DE); Juri Platonov, Grunwald (DE); Thomas Gebauer, Munich (DE); Pawel Kaczmarczyk, Munich (DE)

(73) Assignee: ESG Elektroniksystem-Und Logistik-GMBH, Furstenfeldbruck (DE)

( * ) Notice: Subject to any disclaimer, the term of this patent is extended or adjusted under 35 U.S.C. 154(b) by 0 days.

(21) Appl. No.: 14/373,561

(22) PCT Filed: Jan. 17, 2013

(86) PCT No.: PCT/EP2013/050830
§ 371 (c)(1),
(2) Date: Jul. 21, 2014

(87) PCT Pub. No.: WO2013/107814
PCT Pub. Date: Jul. 25, 2013

(65) Prior Publication Data
US 2015/0036885 A1   Feb. 5, 2015

(30) Foreign Application Priority Data

Jan. 20, 2012 (EP) .................................... 12151945

(51) Int. Cl.
*G06T 7/00* (2006.01)
*G06T 7/20* (2006.01)
*H04N 17/00* (2006.01)

(52) U.S. Cl.
CPC ............ *G06T 7/0018* (2013.01); *G06T 7/0042* (2013.01); *G06T 7/2033* (2013.01);
(Continued)

(58) Field of Classification Search
CPC ...... G06T 7/0018; G06T 7/004; G06T 7/0042; G06T 7/20; G06T 7/2033; G06T 2207/10016; G06T 2207/30244; G06T 2207/30252; G06K 9/00791
See application file for complete search history.

(56) References Cited

U.S. PATENT DOCUMENTS

2009/0290032 A1* 11/2009 Zhang et al. ................ 348/211.9
2010/0165102 A1*  7/2010 Klebanov et al. ............. 348/135
(Continued)

FOREIGN PATENT DOCUMENTS

DE    102010021221 A1   6/2011   ............. B60R 11/04
EP       1498689 A1     1/2005   ............. G01B 11/00

OTHER PUBLICATIONS

M Miksch et al. "Homography-Based Extrinsic Self-Calibration for Cameras in Automotive Applications." Workshop on Intelligent Transportation. Mar. 1, 2010, pp. 17-22, XP055030562.
(Continued)

*Primary Examiner* — Andrew W Johns
(74) *Attorney, Agent, or Firm* — Huffman Law Group, PC

(57) ABSTRACT

A method for determining the orientation of a video camera attached to a vehicle relative to the vehicle coordinate system is disclosed. Using a video camera an incremental motion is measured based on the optical flow of the video stream. A linear motion component and a rotational motion component are determined. Based on a determined rotational angle the incremental motion is classified as linear or as rotational. The directional vector of the linear motion is used to estimate the longitudinal axis of the vehicle, and the rotational vector of the rotational motion is used for estimating the normal to the vehicle plane. Based thereon the orientation of the camera follows.

8 Claims, 1 Drawing Sheet

(52) U.S. Cl.
CPC .... *H04N17/002* (2013.01); *G06T 2207/10016* (2013.01); *G06T 2207/30244* (2013.01); *G06T 2207/30252* (2013.01)

(56) References Cited

U.S. PATENT DOCUMENTS

| | | | |
|---|---|---|---|
| 2010/0201814 A1* | 8/2010 | Zhang et al. | 348/148 |
| 2010/0220173 A1* | 9/2010 | Anguelov et al. | 348/36 |
| 2012/0176492 A1* | 7/2012 | Garin | 348/116 |
| 2014/0347486 A1* | 11/2014 | Okouneva | G06T 7/0018 |

OTHER PUBLICATIONS

Ruland T et al. "Hand-eye Autocalibration of Camera Positions on Vehicles." Intelligent Transportation Systems (ITSC) 2010. 13$^{th}$ International IEEE Conference. Sep. 19, 2010, pp. 367-372, XP031792805.

Nister D et al. "Visual Odometry." Proceedings of the 2004 IEEE Computer Society Conference on Computer Vision and Pattern Recognition. Jun. 27, 2004. pp. 652-659, XP010708622.

* cited by examiner

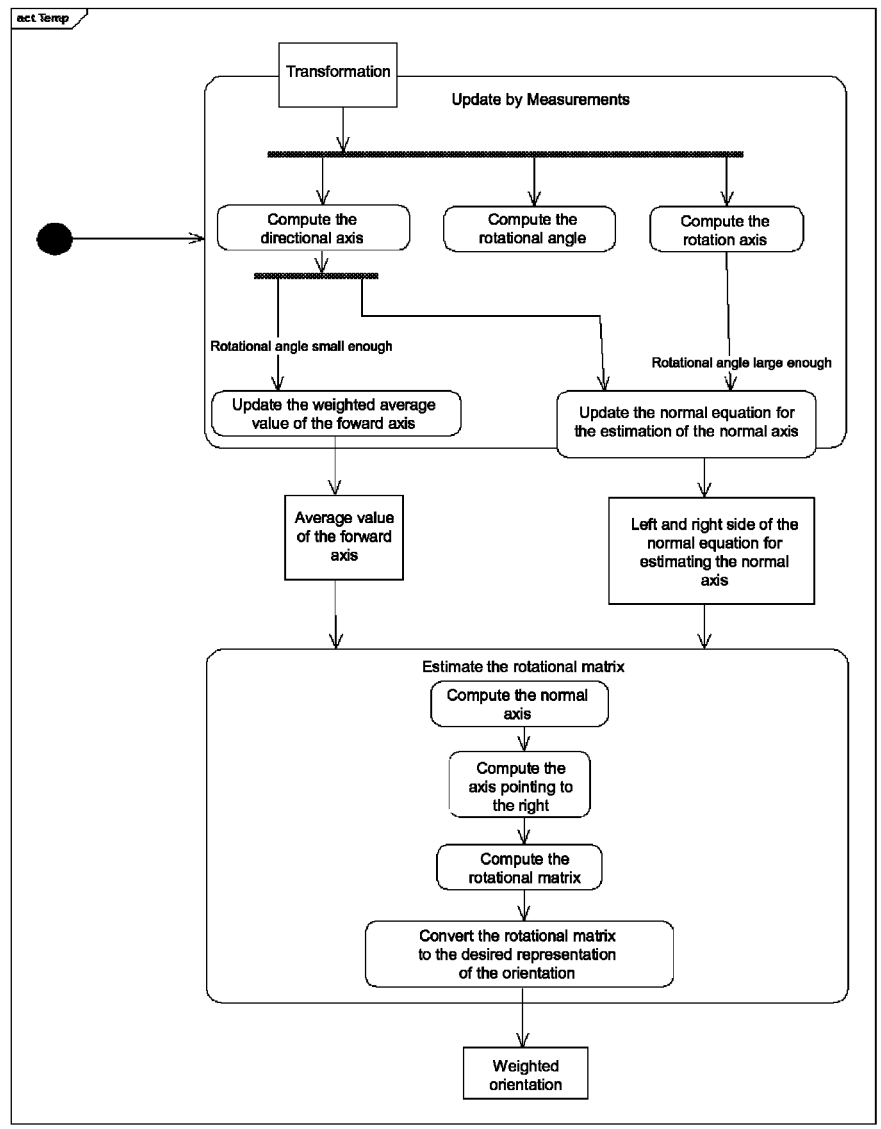

METHOD AND DEVICE FOR ONLINE CALIBRATION OF VEHICLE CAMERAS

The invention relates to a method and an apparatus for determining the orientation of a video camera attached to a vehicle relative to the coordinate system of the vehicle, i.e. an automatic camera-to-vehicle-calibration (in the following referred to as online calibration).

The determination of the camera orientation with respect to a vehicle today is performed by a so-called end-of-line calibration. This refers to a dedicated hardware setup at the end of a production cycle of a vehicle.

The procedure is unflexible and at the same time costly. The biggest disadvantage of this rigid calibration procedure consists in the assumption that the camera orientation will not change during the usage of the vehicle by the end user (driver). However, mechanic loads and temperature influences lead to a decalibration, i.e. to a discrepancy between the actual values and the one determined in the factory. Therefore there is the technical problem that a decalibration of the camera system occurring during practical usage (by effects of mechanical loads and temperature influences on the vehicle structure), which results in an inexact or wrong position of the camera relative to the vehicle and thereby in inexact or wrong input data for e.g. a driver assisting system (ADAS).

For this reason the vehicle manufacturers have a big interest to replace or supplement the end-of-line-calibration by a fully automatic calibration at the end user.

The object of the invention therefore is such a fully automatic calibration, as well as that the decalibration, which occurs, is corrected automatically while driving.

Already existing methods for online calibration are based either on the detection of road markings or are based on detecting features on the road. While the firstly mentioned methods lead to a strong restriction of the environments suitable for calibration, the latter ones are prone to errors, since on one hand the assumption of a flat road in a certain image region is not always fulfilled, and on the other hand the sparse tarmac texture is a rather unfavorable environment with respect to feature extraction.

Concepts which are based on the detection of road markings are for example described in Á. Catalá-Prat, J. Rataj, and R. Reulke, Self-calibration system for the orientation of a vehicle camera, in Proc. of the ISPRS Com. V Symposium: Image Engineering and Vision Metrology, 2006, pp. 68-73, as well as in S. Hold, S. Gormer, A. Kummert, M. Meuter, and S. Muller-Schneiders, A novel approach for the online initial calibration of extrinsic parameters for a car-mounted camera, in Intelligent Transportation Systems, 2009. ITSC'09. 12th Inter-national IEEE Conference on, IEEE, 2009, pp. 1-6., or in M. Wu and X. An, An automatic extrinsic parameter calibration method for camera-on-vehicle on structured road, in Vehicular Electronics and Safety, 2007. IC-VES. IEEE International Conference on, IEEE, 2007, pp. 1-5.

The system described in M. Miksch, B. Yang, and K. Zimmermann, Homography-based extrinsic self-calibration for cameras in automotive applications, in Workshop on Intelligent Transportation, 2010, pp. 17-22, uses the natural texture of the tarmac for the calibration, however, it is assuming a flat tarmac, and its orientation in the image needs to be known and the system requires the vehicle odometry.

Therefore it is an object of the invention to provide an online calibration method and an apparatus which avoids the disadvantages of the described prior art.

According to one embodiment there is provided a method for determining the orientation of a video camera attached to a vehicle relative to the vehicle coordinate system, comprising:

Measuring an incremental vehicle motion in the coordinate system of the video camera based on the optical flow of the video stream of the video camera;

representing the incremental vehicle motion by a motion consisting of a linear motion component and a rotational motion, wherein the linear motion component is represented by a directional vector and the rotational motion is represented by a rotation axis and a rotational angle;

classifying the measured incremental vehicle motion as a linear motion or as a rotational motion based on the determined rotational angle;

measuring at least one incremental motion which has been classified as a linear motion;

measuring at least one incremental motion which has been classified as a rotational motion; and using the directional vector of the at least one measured linear motion for estimating the longitudinal axis of the vehicle;

using the rotational vector of the at least one measured rotational motion for estimating the normal to the vehicle plane so that the orientation of the camera relative to the vehicle coordinate system follows from the vehicle longitudinal axis and the normal to the vehicle plane, which have been determined in the coordinate system of the camera, respectively.

By using data of merely the visual odometry further information sources can be omitted. The usage of these data for online calibration becomes possible by using a comparatively simple model of the vehicle motion which classifies a motion into a rotational motion or a linear motion and which then based thereon determines directly based on the measured motion an estimation of the vehicle longitudinal axis or the vehicle normal.

According to one embodiment the method further comprises:

Measuring a plurality of incremental vehicle motions;

Using the plurality of estimations of the vehicle longitudinal axis and the rotational axis for determining an improved estimation for the vehicle longitudinal axis and the rotational axis.

By including a plurality of measurements into the estimation the accuracy can be improved.

According to one embodiment the method further comprises:

If the rotational angle of the incremental vehicle motion is smaller than a certain threshold, classifying the motion as a linear motion;

If the rotational angle of the incremental motion is larger than a certain threshold, classifying the motion as a rotational motion.

In this manner a vehicle motion can be classified in a simple way into one of the two categories "linear motion" or "maneuver/curve/rotational motion".

According to one embodiment the method further comprises:

Using the normal to the plane of the linear motion or the linear motion component as a further estimation for the normal to the vehicle longitudinal axis in addition to the rotational axis;

Determining an estimation for the normal to the vehicle plane based on a combination of the normal to the determined linear motion or motion component and the rotational axis of the rotational motion.

Thereby also the fact that the plane of the linear motion (through its normal) conveys information about the normal of the vehicle and thereby the rotational axis can be considered.

According to one embodiment the combination is determined based on the requirement that the normal to the plane of the linear motion as determined from the measurement or from the linear motion component and the rotational vector should be in parallel.

This enables the fusion of the data of the linear motion and the rotational motion.

According to one embodiment the estimated value for the longitudinal axis of the vehicle and the normal to the vehicle is determined iteratively by repeated measurement of the incremental vehicle motion.

This improves the accuracy of the estimation.

According to one embodiment the method further comprises:
Determining an updated value of the normal to the vehicle by measurement i as $$\hat{t}_c = \Lambda_{\hat{t}_c}^{i-1} \sum_{n=0} (Q_t(t_c^n) + R_t(t_c^n))^{-1} t_c^n$$

with $\Lambda_{\hat{t}_c}^i = \Lambda_{\hat{t}_c}^{i-1} + (Q_t(t_c^i) + R_t(t_c^i))^{-1}$ as weight or information matrix and with $Q_t$ and $Q_r$ as covariance matrices of the linear vehicle axis or the normal to the vehicle having Gaussian process noise.

In this manner an advantageous measuring model for the estimation can be implemented.

According to one embodiment an apparatus for determining the orientation of a video camera attached to a vehicle relative to a vehicle coordinate system comprises:
A module for measuring an incremental vehicle motion in the coordinate system of the video camera based on the optical flow of the video stream of the video camera;
A module for representing the incremental vehicle motion by a motion consisting of a linear motion component and a rotational motion, wherein the linear motion component is represented by a directional vector and the rotational motion is represented by a rotation axis and a rotational angle;
A module for classifying the measured incremental vehicle motion as a linear motion or as a rotational motion based on the determined rotational angle;
A module for measuring at least one incremental motion which has been classified as a linear motion;
A module for measuring at least one incremental motion which has been classified as a rotational motion; and
A module for using the directional vector of the at least one measured linear motion for estimating the longitudinal axis of the vehicle;
A module for using the rotational vector of the at least one measured rotational motion for estimating the normal to the vehicle plane so that the orientation of the camera relative to the vehicle coordinate system follows from the vehicle longitudinal axis and the normal to the vehicle plane, which have been determined in the coordinate system of the camera, respectively.

According to one embodiment the apparatus further comprises:
One or more modules for performing a method according to one of the embodiments of the invention.

According to one embodiment there is provided a computer program comprising: Computer program code which, when being executed on the computer, enables it to perform a method according to one of the embodiments of the invention.

In the following the invention will be described by embodiments in detail.

Thereby FIG. 1 shows the process of an online calibration according to an embodiment of the invention.

According to one embodiment at first an estimation of the motion of a video camera (attached to the vehicle) is performed based on the so-called "optical flow" by means of camera video data (image sequences). For this purpose the so-called "visual odometry" can be used as it is for example described in D. Nistér, O. Naroditsky, and J. Bergen, Visual odometry, in Computer Vision and Pattern Recognition, 2004. CVPR 2004. Proceedings of the 2004 IEEE Computer Society Conference on, vol. 1, IEEE, 2004, pp. 1-652. This then delivers in the coordinate system of the camera the camera motion in 5 degrees of freedom, i.e. motion direction and 3 orientational parameters.

By means of visual odometry then based on the optical flow (in repeated measurement steps or motion steps i) the motion of the vehicle is determined, i.e. it is determined by which amount the vehicle has moved in the 5 degrees of freedom.

Based thereon then by means of a relatively simple model of the vehicle motion the longitudinal axis of the vehicle and the normal axis of the vehicle (in the coordinate system of the camera) are determined. This then directly results in the orientation of the camera relative to the vehicle coordinate system and thereby the online calibration of the camera.

The used model of the vehicle motion according to one embodiment is based on that the possible motion of the vehicle can be classified into one of two motion patterns which respectively are typical for an urban environment, namely:
a) at least one linear vehicle motion and
b) a maneuver, in which a rotation (curve) around a rotational axis is driven.

The determination or decision whether a vehicle motion is a linear motion or a maneuver can for example be performed based on the measured rotational angle.

If a motion of the vehicle, which has been determined, is determined to belong to one of the two motion patterns, then for a certain measured motion step i the following information can be determined:
1. Determination of the motion direction in case of a linear motion
2. Determination of the rotational axis in case of a vehicle maneuver A further assumption of the motion model according to one embodiment consists in that the "linear motion" follows the longitudinal axis of the vehicle. The motion vector which has been determined in step i from the visual odometry therefore is an "estimation" for the longitudinal axis of the vehicle (in the coordinate system of the camera). At the same time from the normal to the motion plane of the linear motion there follows an estimation of a normal/perpendicular axis of the vehicle.

Another estimation of the normal axis of the vehicle follows from a motion step which has been classified as "rotation" or "curve" or "maneuver".

Since a curve motion is a rotation around an axis, which is parallel to the normal axis of the vehicle, the rotational axis as determined for a maneuver as well as the normal to the plane of the linear motion component both contain information with respect to the normal axis of the vehicle. These two information can then be "fusioned", e.g. if for example during the search for a solution there is considered the requirement that the determined normal to the plane of the linear motion component and the determined rotational axis for the case of the maneuver are parallel. The rotational axis of the rotation component as determined from the visual odometry represents an estimation of this normal axis.

In a single measurement step thus there follows from the visual odometry or the optical flow an estimation of the vector of the linear motion and thereby the longitudinal axis of the vehicle, or an estimation of the rotational axis and thereby the normal to the vehicle (always in the coordinate system of the vehicle camera).

The determination of the estimated values can be repeated in repeated measurement steps in order to improve the measurement accuracy by determining the estimated value based on the evaluation of the plurality of measurement steps. In the determination of the normal to the vehicle furthermore measurement data of the linear motion component and the rotational motion component can be fused by searching for solutions or a solution in which the normal of the motion plane of the linear motion and the rotational axis are parallel.

Opposite to the most other methods there is basically no need for information of the vehicle sensor equipment (e.g. speed), although these can be used for improving the robustness. Furthermore road markings or tarmac texture do not play any role.

In the following a further embodiment of the invention will be described.

Also here the online calibration is based on the motion estimation of a video camera attached to the vehicle under consideration of the video stream of this camera as well as based on a simple vehicle motion model. Thereby the motion estimation is based on the so-called optical flow, i.e. a set of two-dimensional features which are followed over time in the vide stream and which then results in an estimation for the motion of the features.

The optical flow is a weak requirement for the environment, since only the presence of point-like features is to be expected, which in usual vehicle environments is mostly the case. Furthermore it is not necessary that the features are lying on a single plane, for example on the road.

For a successful calibration at least one linear motion and one maneuver are necessary, a pattern which is especially prevailing in urban environments. Further motions or corresponding measurements can be used to improve the accuracy.

In its core the approach in this embodiment is based on the determination of the motion direction in the local camera coordinate system in case of a linear motion or the determination of a rotational axis for the case of a rotational motion. A measured incremental vehicle motion thereby is represented by means of the linear motion vector, the rotational axis and the rotational angle. Then the motion is classified as to whether it is a linear motion or a rotational motion.

If it is a linear motion, the thus determined axis corresponds to the longitudinal axis of the vehicle. This is based on the plausible assumption that a linear motion follows the longitudinal axis of the vehicle.

If on the other hand the motion is classified as a rotational motion, from the rotational axis in the local camera coordinate system there follows the normal axis in the vehicle coordinate system corresponding to it. This is based on the also plausible assumption that a rotational motion is directed around the normal axis in the vehicle coordinate system, i.e. around the normal to the vehicle plane (or a parallel thereto).

Furthermore from the motion vectors in the local camera coordinate system there can be determined the normal to the motion plane (the linear motion component) which carries the same information as the rotational axis and can be fusioned with it. Such a "fusion" can for example be performed by requiring that the rotational axis and the normal to the plane of the linear motion component should be in parallel and by searching a solution which fulfils this requirement or fulfils it as good as possible. In this manner not only an improved estimation for the normal of the vehicle can be determined, the determination of which is not only based on the rotational axis, but also on the basis of the normal to the plane of the linear motion component.

In the following a further embodiment of the invention will be described in detail.

Also in this embodiment for the execution of the online calibration there is required the availability of the camera motion in 5 degrees of freedom (motion direction and 3 orientational parameters), which are derived by means of visual odometry.

The embodiment described in the following is thereby based on two (evidently plausible) assumptions:
1. The dominant motion component of the vehicle is coincident with the longitudinal axis of the vehicle.
2. The motion of the vehicle takes place in one dominant plane.

Since the video camera to be calibrated is rigidly attached to the vehicle, its motion follows the same restrictions. Thereby the dominant motion component in the local camera coordinate system corresponds to the longitudinal axis of the vehicle and the normal to the dominant motion component in the camera coordinate system corresponds to the axis normal to the vehicle.

In praxis, however, the vehicle dynamics deviates significantly from the ideal plane motion. For example, orientation changes of the vehicle coordinate system with respect to the road plane take place along all coordinate axes: pitch, yaw, and roll. Furthermore, translational motions along the vertical axis take place, even if their amplitude is small relative to the amplitude of the forward and sideward motion. These deviations from the ideal motion and rotation in one plane are modelled in the present embodiment by Gaussian noise, the so-called process noise.

For that purpose at first the (mathematical-physical) modelling of the measured motion is described.

Let be $T_c = [R_c | t_c]$ Euclidean transformation of a video camera which is rigidly attached to the vehicle between two moments in time $t_{n-1}$ and $t_n$. Thereby $R_c$ is a rotational matrix in $R_3$, $t_c$ is a translational vector also in $R_3$ and $[R_c | t_c]$ is a matrix concatenation. Thereby $T_c$ is a 3×4-matrix. The rotational matrix $R_c$ can be decomposed into a rotational axis $r_c$ and a rotational angle $\theta_c$ around this rotational axis (for example by means of the Rodrigues formula). Thereby the translational vector $t_c$ represents the motion direction and the rotational axis $R_c$ represents the vehicle motion in the camera coordinate system. If $\theta_c \approx 0$, then the translational axis $t_c$—except for a potential motion component normal to the road plane—coincides with the longitudinal axis of the vehicle. One therefore can write:

$$t_c = \hat{t}_c + q_t$$

where $\hat{t}_c$ is the longitudinal axis of the vehicle in the camera coordinate system and $q_t$ is the auditive Gaussian process noise with expectation value 0 and covariance matrix $Q_t$. If, however, $\theta_c \gg 0$, one can with high probability expect a maneuver, where rc defines the maneuver point. One again writes:

$$r_c = \hat{r}_c + q_r$$

with $\hat{r}_c$ as vertical vehicle plane in the camera coordinate system and $q^r$ as Gaussian process noise with expectation value 0 and covariance matrix $Q_r$. If one succeeds in estimating and $\hat{t}_c$ and $\hat{r}_c$, the orientation of the camera coordinate system with respect to the vehicle coordinate system can be derived.

In the following, the measurement model of the embodiment will be described in more detail.

As a measurement there is considered the spatial Euclidian transformation $T_c^i$ between two moments in time $t_{i-1}$ and $t_i$ in the camera coordinate system. This transformation can be determined from the video stream, for example by means of visual odometry from the optical flow. From $T_c^i$ then the directional vector $t_c^i$, the rotational axis $r_c^i$ and the angle $\theta_c^i$ is determined. Each measurement is assumed to be noisy with expectation value 0 and covariance matrices $R_t$ and $R_r$.

In the following the estimation of the camera orientation with respect to the vehicle will be described in more detail.

FIG. 1 illustrates thereby the internal sequence of the algorithmic steps. After from the measurement $T_c^i$ there have been extracted the directional vector $t_c^i$, the rotational axis $r_c^i$ and the rotational angle $\theta_c^i$, it now has to be checked whether it is a linear motion or a maneuver (i.e. a rotational motion or a curve). For that purpose the rotational angle is compared with two thresholds mlow and mhigh. If $\theta ci$<mlow, one assumes a linear motion. If on the other hand $\theta ci$>mhigh, a maneuver is present.

The two thresholds can for example be determined by empirical analysis of the vehicle dynamics. According to one embodiment for example there are used for mlow 2 degrees/second, for mhigh 10 degrees/second. Thereby a normalization is performed to the sampling rate of the video camera.

If a linear motion is present, the update of the average longitudinal axis of the camera coordinate system $\hat{t}_c$ is performed:

$$\Lambda_{\hat{t}_c}^i = \Lambda_{\hat{t}_c}^{i-1} + (Q_t(t_c^i) + R_t(t_c^i))^{-1} \quad (1)$$

$$\hat{t}_c = \Lambda_{\hat{t}_c}^{i-1} \sum_{n=0}^{i} (Q_t(t_c^n) + R_t(t_c^n))^{-1} t_c^n, \quad (2)$$

where $\Lambda$ is the so-called weight or information matrix.

In case of a maneuver an update of the normal vehicle axis takes place (up-vector). Thereby it is required that the up-vector is perpendicular to all directional vectors $n^T t_c^i = 0$, for all $i$ and at the same time parallel to all rotational axes:

$r_c^i = n$, for all $i$.

These requirements can be expressed in a linear equation system of the form $\Lambda n = b$, with $$A = \begin{pmatrix} t_c^{0T} \\ \vdots \\ t_c^{iT} \\ I^0 \\ \vdots \\ I^i \end{pmatrix}, \quad (3)$$

$$b = \begin{pmatrix} 0^0 \\ \vdots \\ 0^i \\ r_c^0 \\ \vdots \\ r_c^i \end{pmatrix} \quad (4)$$

and I as 3×3-unity matrix.

After determination of the up-vector there are then two vehicle axes present in the camera coordinate system, where the orientation of the camera with respect to the vehicle is uniquely defined.

FIG. 1 schematically illustrates the sequence of the embodiment.

From the transformation of the measurement updates the direction of the motion vector, the rotational angle and the rotational axis are determined. If the rotational angle is smaller than the threshold, the directional vector is updated based on the measurement. If the rotational angle is larger than the threshold, there follows an update of the equation system for the up-vector (=the estimation of the normal to the vehicle).

This is then performed for the left hand side and the right hand side of the up-vector. Then the axis of the up-vector is calculated therefrom.

Finally the still missing "right hand axis" or the "axis pointing to the right" of the vehicle coordinate system in the coordinate system of the camera is calculated, the rotational matrix for the rotation of the camera coordinate system into the coordinate system of the vehicle is determined, and then finally represented in an arbitrary representation.

In this manner there follows a weighted estimation of the orientation of the camera related to the coordinate system of the vehicle.

The skilled person readily recognizes that the embodiments of the invention especially can be implemented by means of a suitably programmed computer which processes the images delivered by the video camera and thereby carries out the estimation of the orientation.

What is claimed is:

1. A method for determining the orientation of a video camera attached to a vehicle relative to the vehicle coordinate system, comprising:
    measuring an incremental vehicle motion in the coordinate system of the video camera based on the optical flow of the video stream of the video camera;
    representing the incremental vehicle motion by a motion consisting of a linear motion component and a rotational motion, wherein the linear motion component is represented by a directional vector and the rotational motion is represented by a rotation axis and a rotational angle;
    classifying the measured incremental vehicle motion as a linear motion or as a rotational motion based on the determined rotational angle;
    measuring at least one incremental motion which has been classified as a linear motion;
    measuring at least one incremental motion which has been classified as a rotational motion;
    using the directional vector of the at least one measured linear motion for estimating the longitudinal axis of the vehicle; and
    using the rotational vector of the at least one measured rotational motion for estimating the normal to the vehicle plane so that the orientation of the camera relative to the vehicle coordinate system follows from the vehicle longitudinal axis and the normal to the vehicle plane, which have been determined in the coordinate system of the camera, respectively.

2. The method of claim 1, further comprising:
    measuring a plurality of incremental vehicle motions; and
    using the plurality of estimations of the vehicle longitudinal axis and the rotational axis for determining an improved estimation for the vehicle longitudinal axis and the rotational axis.

3. The method of claim 1, further comprising:
if the rotational angle of the incremental vehicle motion is smaller than a certain threshold, classifying the motion as a linear motion; and
if the rotational angle of the incremental motion is larger than a certain threshold, classifying the motion as a rotational motion.

4. The method of claim 1, further comprising:
using the normal to the plane of the linear motion or the linear motion component as a further estimation for the normal to the vehicle longitudinal axis in addition to the rotational axis; and
determining an estimation for the normal to the vehicle plane based on a combination of the normal to the determined linear motion or motion component and the rotational axis of the rotational motion.

5. The method of claim 4, wherein
the combination is determined based on the requirement that the normal to the plane of the linear motion as determined from the measurement or from the linear motion component and the rotational vector should be in parallel.

6. The method of claim 1, wherein
the estimated value for the longitudinal axis of the vehicle and the normal to the vehicle is determined iteratively by repeated measurement of the incremental vehicle motion.

7. The method of claim 6, comprising:
determining an updated value of the normal to the vehicle by measurement i as $$\hat{t}_c = \Lambda_{\hat{t}_c}^{i-1} \sum_{n=0} (Q_t(t_c^n) + R_t(t_c^n))^{-1} t_c^n$$

with $\Lambda_{\hat{t}_c}^{i} = \Lambda_{\hat{t}_c}^{i-1} + (Q_t(t_c^i) + R_t(t_c^i))^{-1}$ as weight or information matrix and with $Q_t$ and $Q_r$ as covariance matrices of the linear vehicle axis or the normal to the vehicle having Gaussian process noise.

8. A computer program comprising:
computer program code embodied on a non-transitory computer-readable medium which, when being executed on the computer, enables it to perform a method according to claim 1.

\* \* \* \* \*